US012808242B2

(12) United States Patent
Qi

(10) Patent No.: US 12,808,242 B2
(45) Date of Patent: Nov. 24, 2026

(54) EMERGENCY OPENING STRUCTURE FOR REVOLVING DOOR AND REVOLVING DOOR ASSEMBLY

(71) Applicant: Assa Abloy Entrance Systems AB, Landskrona (SE)

(72) Inventor: Martin Qi, Suzhou (CN)

(73) Assignee: Assa Abloy Entrance Systems AB, Landskrona (SE)

( * ) Notice: Subject to any disclaimer, the term of this patent is extended or adjusted under 35 U.S.C. 154(b) by 0 days.

(21) Appl. No.: 18/864,668

(22) PCT Filed: May 17, 2023

(86) PCT No.: PCT/EP2023/063331
§ 371 (c)(1),
(2) Date: Nov. 11, 2024

(87) PCT Pub. No.: WO2023/222801
PCT Pub. Date: Nov. 23, 2023

(65) Prior Publication Data

US 2025/0314112 A1 Oct. 9, 2025

(30) Foreign Application Priority Data

May 18, 2022 (CN) ......................... 202210550852.2

(51) Int. Cl.
*E05D 15/02* (2006.01)
*E05D 15/48* (2006.01)
*E06B 3/90* (2006.01)

(52) U.S. Cl.
CPC ............. *E05D 15/02* (2013.01); *E05D 15/48* (2013.01); *E06B 3/90* (2013.01); *E05D 2015/482* (2013.01); *E05Y 2800/252* (2013.01)

(58) Field of Classification Search
CPC ..... E05D 15/02; E05D 2015/482; E06B 3/90; E05B 65/0071
See application file for complete search history.

(56) References Cited

U.S. PATENT DOCUMENTS 1,963,881 A * 6/1934 Blanchard ................ E06B 3/90 49/44
1,983,353 A * 12/1934 Ely .......................... E06B 3/90 49/45

(Continued)

FOREIGN PATENT DOCUMENTS

CA 981109 1/1976
CN 2799808 Y 7/2006

(Continued)

OTHER PUBLICATIONS

Written Opinion and International Search Report for PCT/EP2023/063331, dated Aug. 23, 2023.

(Continued)

*Primary Examiner* — Catherine A Kelly
(74) *Attorney, Agent, or Firm* — Wissing Miller LLP

(57) ABSTRACT

ASSA ABLOY Entrance Systems AB has developed an emergency opening structure for a revolving door and a revolving door assembly, the emergency opening structure is connected with a first connecting pin and a second connecting pin on a driving shaft of the revolving door, and includes: a slider assembly having a first side surface and a second side surface opposite to each other; and a base having a sidewall, wherein the slider assembly is disposed on the inner side of the sidewall and is configured to move relative to the base, a first sliding channel is formed between a first portion of the sidewall and the first side surface for accommodating the first connecting pin, and a second sliding channel is formed between a second portion of the sidewall and the second side surface for accommodating the second (Continued)

connecting pin, wherein the emergency opening structure has a normal driving position and an unlocking position, in the normal driving position, the first connecting pin and the second connecting pin are clamped in the first sliding channel and the second sliding channel, respectively, and in the unlocking position, the base rotates around the second connecting pin to a position where the first connecting pin slides out of the first sliding channel, while the second side surface and the second portion of the sidewall remains pressing against the second connecting pin, so as to prevent the second connecting pin from disengaging from the second sliding channel.

13 Claims, 5 Drawing Sheets

(56) References Cited

U.S. PATENT DOCUMENTS

| | | | | | |
|---|---|---|---|---|---|
| 1,983,396 | A * | 12/1934 | Peremi | E06B 3/90 | 49/45 |
| 2,053,875 | A * | 9/1936 | Pedersen | E06B 3/90 | 49/43 |
| 2,111,182 | A * | 3/1938 | Hagenbook | E06B 3/90 | 49/44 |
| 2,148,035 | A * | 2/1939 | Peremi | E06B 3/90 | 49/480.1 |
| 2,240,942 | A * | 5/1941 | Peremi | E06B 3/90 | 49/44 |
| 3,762,098 | A * | 10/1973 | Sheckells | E05D 15/02 | 49/44 |
| 3,782,035 | A * | 1/1974 | Lowe | E05D 15/02 | 49/44 |
| 3,793,773 | A * | 2/1974 | Sheckells | E06B 3/90 | 49/141 |
| 4,562,665 | A * | 1/1986 | Blackston | E05B 65/108 | 49/44 |
| 4,640,046 | A * | 2/1987 | Rushford | E05D 15/02 | 49/141 |
| 4,660,322 | A * | 4/1987 | Lowe | E05D 15/02 | 49/44 |
| 4,688,350 | A * | 8/1987 | Hattem | E05D 15/02 | 49/141 |
| 4,970,825 | A * | 11/1990 | Knarvik | E05D 15/02 | 49/44 |
| 4,980,992 | A * | 1/1991 | Liles | E06B 3/90 | 49/44 |
| 6,076,302 | A * | 6/2000 | Otto | E06B 3/90 | 49/44 |
| 6,959,949 | B2 * | 11/2005 | Rockenbach | E05D 15/02 | 109/6 |
| 2008/0172838 | A1 | 7/2008 | Cho | | |

FOREIGN PATENT DOCUMENTS

| | | | | | |
|---|---|---|---|---|---|
| CN | 111321985 | A | 6/2020 | | |
| CN | 112031609 | A | 12/2020 | | |
| DE | 4036881 | A1 * | 5/1992 | E05D 15/02 | |
| GB | 2064642 | | 6/1981 | | |
| WO | 9748870 | | 12/1997 | | |

OTHER PUBLICATIONS

First Office Action in corresponding Chinese Application No. 2022105508522 mailed Aug. 15, 2025. (10 pages).

International Preliminary Report on Patentability in corresponding International Application No. PCT/EP2023/063331 mailed Nov. 28, 2024. (8 pages).

First Office Action in corresponding European Application No. 23728294.2 mailed Apr. 9, 2026. (6 pages).

* cited by examiner

EMERGENCY OPENING STRUCTURE FOR REVOLVING DOOR AND REVOLVING DOOR ASSEMBLY

This application is a 371 of PCT/EP2023/063331, filed on May 17, 2023, published on Nov. 23, 2023, under publication number WO 2023/222801, which claims priority benefits from Chinese Patent Application No. 202210550852.2, filed on May 18, 2022, the disclosure of each of which are incorporated herein by reference.

TECHNICAL FIELD

The present invention relates to the field of doors, in particular to an emergency opening structure for a revolving door and a revolving door assembly.

BACKGROUND

In hotels, office buildings and other locations, revolving doors are usually installed. The revolving door usually includes a fixed frame, and a drive device, a central driving shaft, and two or more door leaves connected to the central driving shaft, which are installed in the fixed frame. When the drive device drives the central driving shaft to rotate, the door leaves are driven to rotate synchronously. When persons pass through the revolving door, they first enter into a space between two door leaves, then walk forward along with the rotation of the door leaves, and finally walk into or out of the hotel or office building through the revolving door.

With increasing improvements of the industrial automation, automatic revolving doors are widely used. When a power failure or a fire alarm occurs, the automatic revolving door is usually configured to automatically unlock itself, and when the locking is unlocked, the door leaf can be manually pushed open to be folded. In addition, the current automatic revolving doors are usually provided with manual opening buttons. When the door leaf needs to be manually pushed (for example, when large items need to be transported through the door), the manual opening button can also be operated to unlock the automatic revolving door, and then the door leaf can be folded to enlarge the passing passage of the automatic revolving door, making it easy for users to quickly exit the revolving door or to transport the large items, etc. However, when the automatic revolving door is unlocked by a control system of the automatic revolving door, if the door leaf is not properly locked and protected, it is easy to cause the door leaf to fall off from the driving shaft of the automatic revolving door, resulting in danger.

SUMMARY

The object of the present invention is to provide an emergency opening structure for a revolving door and a revolving door assembly, which can moderately protect the door leaf that has already been released from automatic locking and in a push-open state, to prevent the door leaf from disengaging from the driving shaft of the revolving door, so as to facilitate the user and the items carried by the user to pass through the revolving door quickly and safely.

According to one aspect of the present invention, an emergency opening structure for a revolving door is provided, the emergency opening structure is configured to be connected with a first connecting pin and a second connecting pin installed on a driving shaft for the revolving door, and includes: a slider assembly having a first side surface and a second side surface opposite to each other; and a base having a sidewall, the slider assembly being disposed on the inner side of the sidewall and configured to move relative to the base, wherein a first sliding channel is formed between a first portion of the sidewall and the first side surface, and a second sliding channel is formed between a second portion of the sidewall and the second side surface, wherein the first sliding channel and the second sliding channel are configured to accommodate the first connecting pin and the second connecting pin, respectively, wherein the emergency opening structure has a normal driving position and an unlocking position, in the normal driving position, the first connecting pin and the second connecting pin are clamped in the first sliding channel and the second sliding channel, respectively, and in the unlocking position, the base rotates around the second connecting pin to a position where the first connecting pin slides out of the first sliding channel, while the second side surface and the second portion of the sidewall remains pressing against the second connecting pin, so as to prevent the second connecting pin from disengaging from the second sliding channel. When the driving shaft stops rotating, if the user pushes the door leaf of the revolving door, the emergency opening structure is used to disconnect the connection between the first connecting pin and the emergency opening structure while keeping the second connecting pin being connected to the emergency opening structure, so that the door leaf can drive the emergency opening structure to rotate relative to the second connecting pin, thereby realizing the folding of the corresponding door leaf. At the same time, since the door leaf is kept connected with the driving shaft through the second connecting pin and the emergency opening structure, the door leaf will not be separated from the driving shaft when it is folded, which improves the safety of emergency opening of the revolving door.

According to another aspect of the present invention, an emergency opening structure for a revolving door is provided, the revolving door is connected with the emergency opening structure through a first connecting pin and a second connecting pin parallel to each other, the emergency opening structure includes a main body and a control mechanism arranged in the main body and is configured to include: a first accommodating cavity for accommodating the first connecting pin and having a first outlet; a second accommodating cavity for accommodating the second connecting pin and having a second outlet, wherein the control mechanism is configured to allow the main body to pivot about the second connecting pin while preventing the second connecting pin from disengaging from the second accommodating cavity via the second outlet, and/or to allow the main body to pivot about the first connecting pin while preventing the first connecting pin from disengaging from the first accommodating cavity via the first outlet.

By controlling the position change of the first connecting pin or the second connecting pin relative to the main body of the emergency opening structure by the control mechanism, the rotation of the door leaf relative to one connecting pin of the revolving door can be achieved to realize the folding of the door leaf, so that when the automatic locking to the door leaf of the revolving door has been released, it is convenient for the user to pass through the revolving door safely and quickly. Also, the door leaf of the revolving door can be folded clockwise and/or counterclockwise, thereby improving the operational convenience when the user leaves from the revolving door.

According to yet another aspect of the present invention, a revolving door assembly is provided, the revolving door assembly includes a driving shaft having a connecting flange, and a door leaf, the revolving door assembly further includes the above-mentioned emergency opening structure fixed to the door leaf, wherein the first connecting pin and the second connecting pin are connected with the connecting flange, wherein a center axis of the driving shaft is substantially perpendicular to a horizontal center line C of the emergency opening structure, and the first connecting pin and the second connecting pin extend parallel to the driving shaft. With such a revolving door assembly, the user can fold the door leaf in an emergency by simply pushing the door leaf, but the door leaf will not be disengaged from the driving shaft, thereby facilitating the user to quickly exit the revolving door or transport bulky items.

BRIEF DESCRIPTION OF THE DRAWINGS

In order to more clearly illustrate technical solutions of the embodiments of the present invention, the following description will be made with reference to the accompanying drawings. It is apparent that the drawings involved in the following description are only showing some embodiments of the present invention. For those skilled in the art, other drawings and other embodiments can also be obtained from these drawings without rendering any creative effort.

DETAILED DESCRIPTION OF THE EMBODIMENTS

Figure 1:
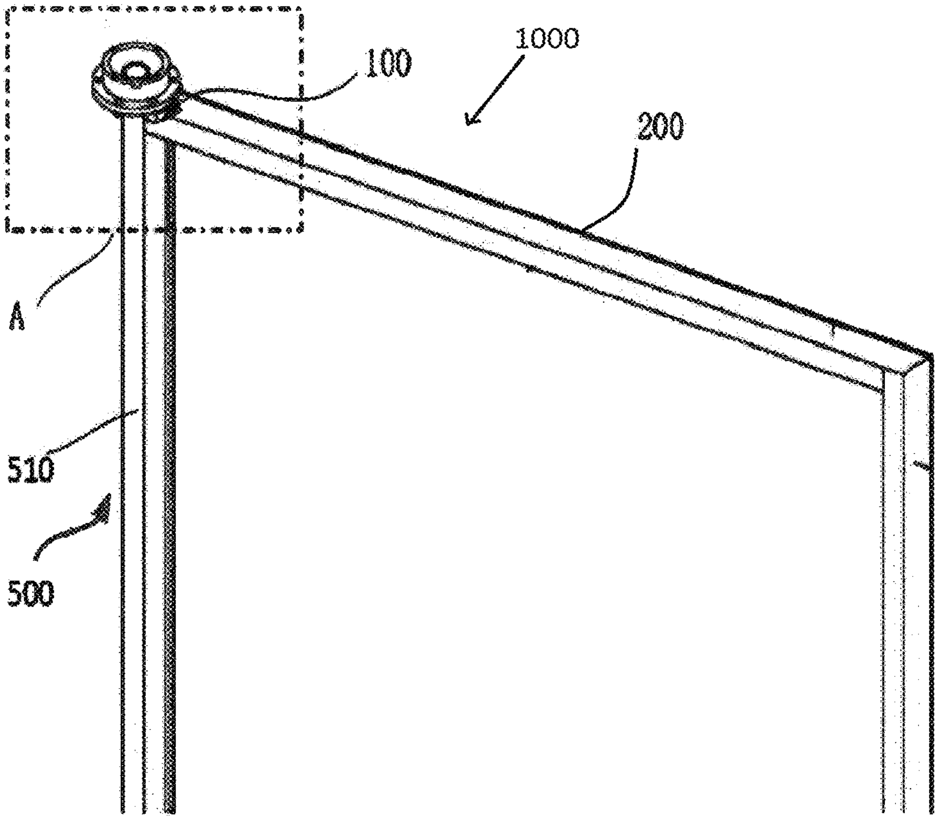
FIG. 1 is a schematic partial perspective view of a revolving door assembly according to an embodiment of the present invention.

In order to make the objectives, technical solutions and advantages of the present invention clearer, the present invention will be further described in detail below through embodiments and in conjunction with the accompanying drawings. It should be understood that the specific embodiments described herein are only used to explain the present invention, but not to limit the present invention.

Terms used herein, such as "first", "second", etc., are only used to distinguish between the described objects and do not have any order or technical meaning. The "connection" and "coupling" mentioned in the present invention, unless otherwise specified, include both direct and indirect connections/couplings. In the description of the present invention, it should be understood that regarding the orientation or positional relationship indicated by the terms "upper", "lower", "front", "rear", "left", "right", "vertical", "horizontal", "top", "bottom", "inner", "outer", "clockwise", "counterclockwise", etc. is based on the orientation or positional relationship shown in the drawings, and is only for the convenience of describing the present invention and simplifying the description, rather than indicating or implying that the indicated device or element must have a particular orientation or be constructed and operated in the particular orientation, and therefore should not be construed as limiting the invention.

In the present invention, unless otherwise expressly specified and limited, a first feature "above" or "under" a second feature may refer to the first and second features being in direct contact with each other, or the first and second features being in contact indirectly through an intermediate media. Also, the first feature being "above", "over" and "on" the second feature may mean that the first feature is directly above or obliquely above the second feature, or simply means that the first feature is arranged at a level higher than that of the second feature. The first feature being "below", "beneath" and "under" the second feature may mean that the first feature is directly below or obliquely below the second feature, or simply means that the first feature is arranged at a specific height lower than that of the second feature.

First, the basic structure of the revolving door assembly 1000 according to the embodiment of the present invention will be described in detail below with reference to FIGS. 1 and 2.

Figure 2:
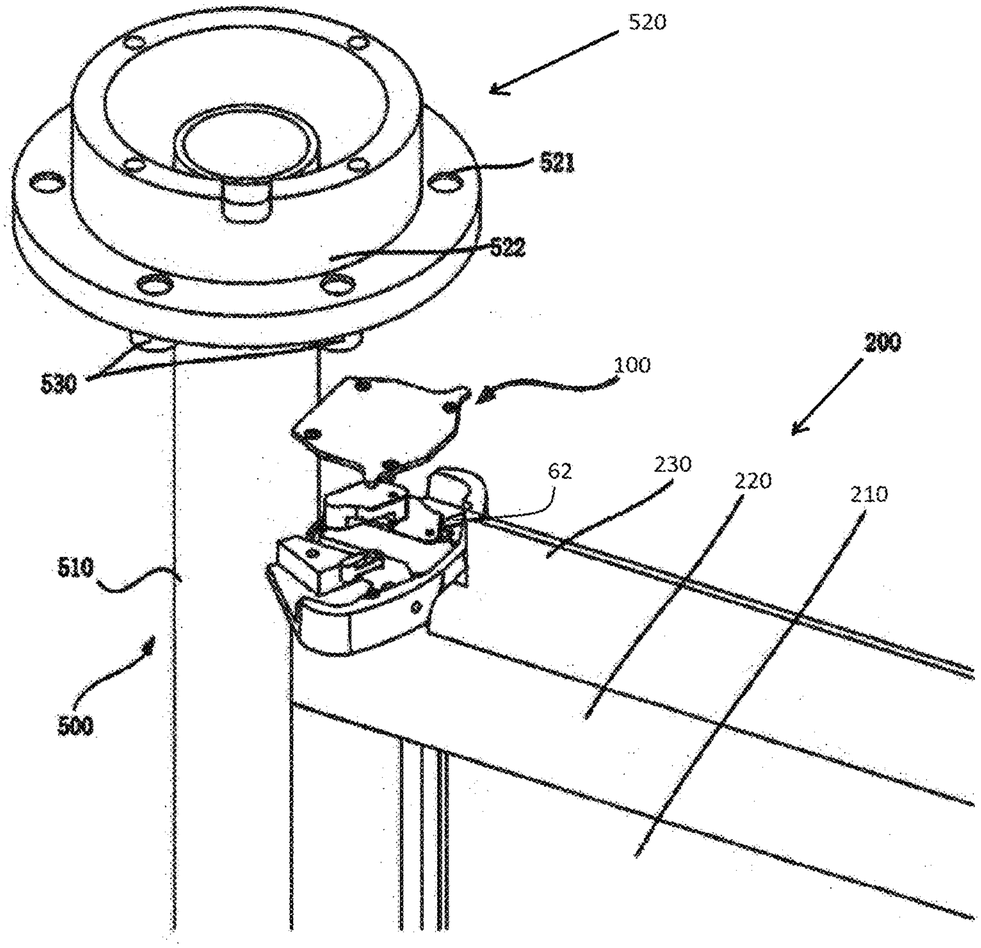
FIG. 2 is a partial exploded perspective view showing a specific structure of part A in FIG. 1.

As shown in FIGS. 1 and 2, the revolving door assembly 1000 according to an embodiment of the present invention includes a generally cylindrical mounting frame (not shown), a drive mechanism 500 (e.g., a driving shaft 510 and a motor (not shown) that drives the driving shaft to rotate), at least two door assemblies 200 connected to the driving shaft, and an emergency opening structure 100 which will be described in detail below. The emergency opening structure 100 is disposed on the door assembly 200, more specifically, disposed on the top of the door assembly 200 and fixedly connected with the door assembly 200 for connecting the door assembly 200 with the drive mechanism 500. The number of door assemblies 200 may be in the range of two to eight.

The drive mechanism 500 includes the motor and the driving shaft 510 having a connecting flange 520 at its top end. The connecting flange 520 is connected with the door assembly 200 by means of connecting pins 530, so that when the motor drives the driving shaft 510 to rotate, the door assembly 200 rotates synchronously along with the driving shaft 510. In the embodiment as shown in FIG. 1, the connecting flange 520 includes a flange body 522 and a flange surrounding the flange body 522. The flange body 522 is fixedly connected with the driving shaft 510, and six connecting holes 521 are arranged along the circumferential direction of the flange, wherein each connecting hole 521 is installed with a fixed connecting pin 530 therein. In this embodiment, each door assembly 200 is connected to the driving shaft 510 through two connecting pins 530, for example pins 531 and 532. More specifically, each door assembly 200 is connected with the driving shaft 510 of the drive mechanism 500 through two connection pins 530 and the emergency opening structure 100.

In the present embodiment, in the normal driving mode, two connecting pins 530 are both drivably connected with the emergency opening structure 100, that is, each connecting pin 530 applies a thrust force to the emergency opening structure 100, thereby applying a rotational torque to the door assembly 200 connecting with the emergency opening structure 100, to drive the door assembly 200 to rotate.

The door assembly 200 includes a door leaf 210 formed, for example, of glass, and a door frame 220 surrounding at least the top of the door leaf 210. The door assembly 200 may also include a shroud 230 disposed on top of the door frame 220. An arm member 20 (described in detail below) of the emergency opening structure 100 may be covered by the shroud 230 to improve aesthetics and dust resistance of the door assembly.

As shown in FIGS. 2 to 5, the emergency opening structure 100 includes a base 10, the arm member 20 connected with the base 10, and a slider assembly 30 disposed in the base 10 and capable of moving or sliding relative to the base 10. The arm member 20 is a rod member for fixedly connecting with the top of the door frame 220. The arm member 20 is connected to the central area outside of a sidewall 19 of the base 10, wherein one end of the arm member 20 connected to the base 10 is fixedly connected to the base 10 or integrally formed with the base 10. The two ends and the middle of the arm member 20 are respectively formed with threaded holes or through holes 201 and 202 to connect the arm member 20 with the door frame 220.

The base 10 is generally formed in a fan shape as a whole, its outer side (i.e., an outer peripheral portion) is formed with the sidewall 19, and its inner side (i.e., an inner peripheral portion) has a shape roughly corresponding to the shape of the driving shaft 51. That is, one end of the arm member 20 is connected to the outer side of the sidewall 19, and the slider assembly 30 is arranged inside of the sidewall 19. The slider assembly 30 has a first side surface 301 and a second side surface 302 opposite to each other. The first side surface 301 is opposite to a first portion 191 of the sidewall 19, the second side surface 302 is opposite to a second portion 192 of the sidewall 19, and the arm member 20 is connected to a third portion 193 of the sidewall 19. Thus, a first sliding channel 101 for accommodating the first connecting pin 531 is formed between the first portion 191 of the sidewall 19 and the first side surface 301, and a second sliding channel 102 for accommodating the second connecting pin 532 is formed between the second portion 192 of the sidewall and the second side surface 302.

Figure 4:
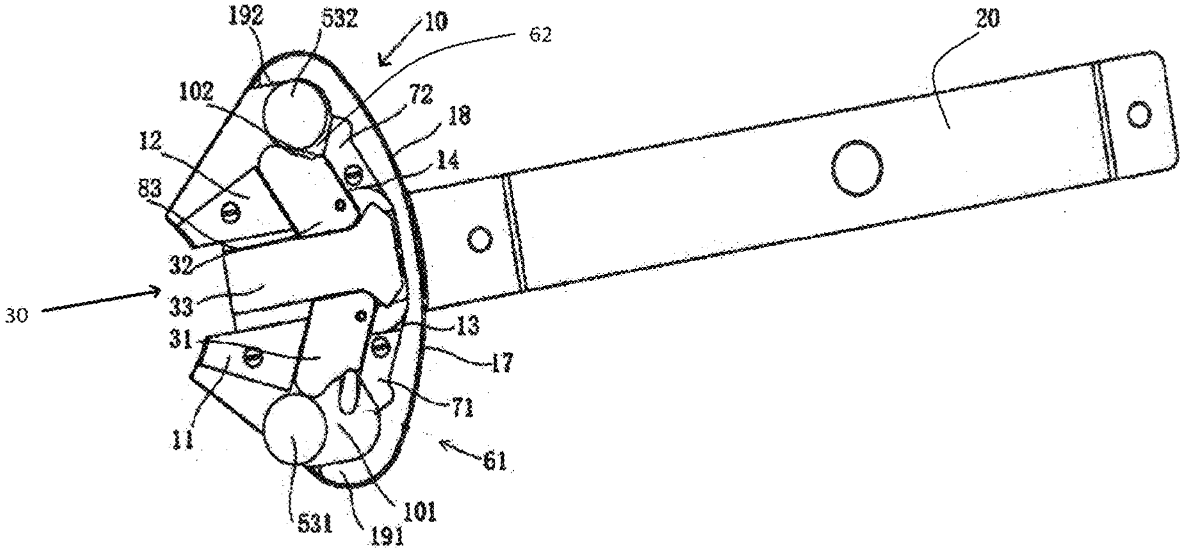
FIG. 4 is a top view of the emergency opening structure for the revolving door in an unlocked position according to an embodiment of the present invention.

In the normal driving position, the first connecting pin 531 and the second connecting pin 532 are tightly clamped in the first sliding channel 101 and the second sliding channel 102, respectively, so that when the driving shaft 510 rotates, the first connecting pin 531 and the second connecting pin 532 are configured to apply thrust forces to the base 10, and then the torque can be applied to the door leaf 210 and the door frame 220. When the automatic locking of the door leaf is released by the control system of the revolving door, if the user is located between two door leaves of the revolving door assembly 1000, the user may push the door leaf 210 to place the emergency opening structure 100 in the unlocked position to fold the door leaf 210. For example, when unlocking counterclockwise as shown in FIG. 4, the base 10 rotates around the second connecting pin 532 to a position where the first connecting pin 531 slides out of the first sliding channel 101 via the first outlet, while the second side surface 302 and the second portion 192 of the sidewall 19 always keep pressing against the second connecting pin 532 to prevent the second connecting pin 532 from disengaging from the second sliding channel 102.

Similarly, when unlocking clockwise, the base 10 rotates around the first connecting pin 531 to a position where the second connecting pin 532 slides out of the second sliding channel 102 via the second outlet, while the first side surface 301 and the first portion 191 of the sidewall 19 always keeps pressing against the first connecting pin 531 to prevent the first connecting pin 531 from disengaging from the first sliding channel 101.

Figure 3:
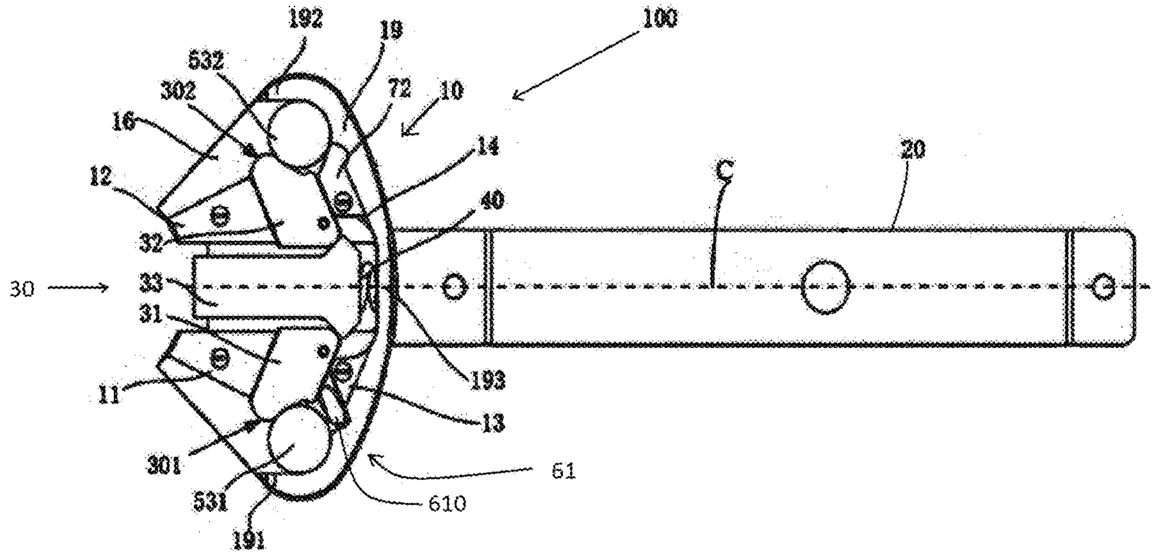
FIG. 3 is a top view of an emergency opening structure for a revolving door in a normal driving position with a first partition plate removed, according to an embodiment of the present invention.

In the embodiment as shown in FIG. 3, the slider assembly 30 includes a first slider 31, a second slider 32, a sliding sleeve 33 and a compression spring 40. One end of the compression spring 40 is inserted into the sliding sleeve 33, and the other end of the spring is connected with the third portion 193 of the sidewall 19 of the base 10. The first slider 31 may push the second slider 32, the sliding sleeve 33 and the compression spring 40 to move, thereby changing positions of the first side surface 301 and the second side surface 302 relative to the sidewall of the base 10, so as to change the shapes of the first sliding channel 101 and the second sliding channel 102. By changing the size of the outlet of the first sliding channel 101, the first connecting pin 531 may slide out of the first sliding channel 101 via the first outlet, thereby realizing the rotation of the base 10 relative to the driving shaft 510, that is, the counterclockwise folding of the door leaf 210.

Similarly, the second slider 32 may push the first slider 31, the sliding sleeve 33 and the compression spring 40 to move, thereby changing the positions of the first side surface 301 and the second side surface 302 relative to the sidewall of the base 10, so as to change the shapes of the first sliding channel 101 and the second sliding channel 102. By changing the size of the second outlet of the second sliding channel 102, the second connecting pin 532 may slide out of the second sliding channel 102 via the second outlet, thereby realizing the rotation of the base 10 relative to the driving shaft 510, that is, the clockwise folding of the door leaf 210.

In the embodiment according to the present application, the initial force with which the first slider 31 pushes the second slider 32 is the reaction force exerted by the fixed first connecting pin 531 when the base 10 is rotating. Similarly, the initial force with which the second slider 32 pushes the first slider 31 is the reaction force exerted by the fixed second connecting pin 532 when the base 10 is rotating.

As shown in FIGS. 3 and 4, the slider assembly 30 further includes an adjustment screw (not shown) mounted at one end of the sliding sleeve 33 and configured to adjust the compression spring by changing the depth of the adjusting screw screwed into the sliding sleeve, to adjust the elastic force applied by the compression spring to the door assembly 200 of the revolving door via the base 10. By arranging the compression spring 40, the emergency opening structure 100 can be provided with a pushing force, so as to keep the first slider 31 and the second slider 32 in the required working positions. The specification selection of the compression spring 40 and the determination of the screw-in amount of the adjustment screw may depend on the weight of the door assembly.

As shown in FIGS. 3 and 4, the sliding sleeve 33 has a tubular body portion having a constant cross-section and a radial protrusion formed at one end of the tubular body portion close to the sidewall of the base. In the normal driving position, the first slider 31 and the second slider 32 are pressed against the radial protrusion, and in the unlocked position, the first slider 31 and the second slider 32 are pressed against the tubular body portion, wherein the radial protrusion is arranged to be closer to the sidewall 19 of the base 10 than the tubular body portion, and the cross-section of the radial protrusion gradually increases and then gradually decreases in a direction away from the tubular body portion.

When the emergency opening structure 100 is changed from the normal driving position to the unlocking position, the sliding sleeve 33 is pressed toward the sidewall 19 by the first slider 31 and the second slider 32, causing the compression spring 40 to be compressed to accumulate elastic force for subsequently resetting the slider assembly 30.

The related structure and operation principle of the slider assembly 30 for realizing the emergency opening structure 100 will be described in more detail below with reference to FIGS. 3 to 8.

Figure 7:
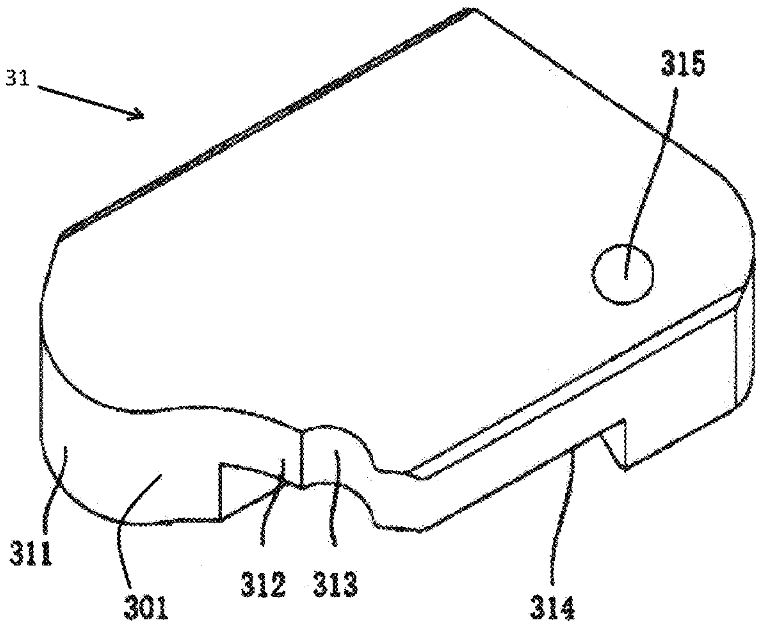
FIG. 7 is a perspective view of a first slider of the emergency opening structure for the revolving door according to an embodiment of the present invention.

As shown in FIG. 7, the first side surface 301 is formed on the first slider 31, and the second side surface 302 is formed on the second slider 32. The first side surface 301 has a first receiving portion 312 and a first pressing portion 311. The second side surface 302 has a second receiving portion 322 and a second pressing portion 321. In the normal driving position, the first connecting pin 531 contacts the first receiving portion 311 and the second connecting pin 532 contacts the second receiving portion 322. In the counterclockwise unlocking position, the first connecting pin 531 presses the first pressing portion 311, and the second receiving portion 322 presses the second connecting pin 532. Once the mechanism has reached the counterclockwise unlocking position shown in FIG. 4, first connecting pin 531 can move out of channel 81, allowing door leaf 210 to swing open to allow persons and objects to move through the door. In the clockwise unlocking position, the second connecting pin 532 presses the second pressing portion 321, and the first receiving portion 312 presses the first connecting pin 531. Once the mechanism has reached the clockwise unlocking position, second connecting pin 532 can move out of channel 82, allowing door leaf 210 to swing open to allow persons and objects to move through the door. In a further embodiment, the first receiving portion 312 and the second receiving portion 322 are formed as concave surfaces, and the first pressing portion 311 and the second pressing portion 321 are formed as convex surfaces. The first pressing portion 321 is closer to the first outlet of the first sliding channel 101 than the first receiving portion 312, and the second pressing portion 321 is closer to the second outlet of the second sliding channel 102 than the second receiving portion 322, respectively.

The base 10 is preferably formed in a symmetrical structure and has a center line C extending along the width direction of the door leaf, and the slider assembly 30 may be symmetrically arranged with respect to the center line of the base 10. That is, in a rest position, the slider assembly 30 may be arranged symmetrically with respect to the center line C of the base 10. The rest position means that the first connecting pin 531 and the second connecting pin 532 inserted into and connected to the emergency opening structure 100 are clamped in the first sliding channel 101 and the second sliding channel 102, respectively, but the first connection pin 531 and the second connecting pin 532 are in the positions where they apply no thrust force to the base 10. In a driving position, the slider assembly 30 is pushed by the first connecting pin 531 and the second connecting pin 532 to move toward one side or the other side of the center line C as a whole, so as to apply the thrust force and the torque to the base 10 and the door leaf 210, respectively. Herein, the rest position and the driving position are collectively referred to as the normal driving position.

In order to achieve the desired movement or sliding of the slider assembly 30 relative to the base 10, for example, the sliding sleeve 33 may slide relative to the base 10 along a first direction, and the first slider 31 can slide relative to the base 10 along a second direction intersecting with the first direction to push the second slider 32 to move via the sliding sleeve 33, so that the second side surface 302 of the second slider 32 and the second portion 192 of the sidewall keep clamping the second connecting pin 532. Corresponding channels for sliding of the first slider 31, the second slider 32 and the sliding sleeve 33 may be formed on the base 10, i.e., the first channel 81, the second channel 82 and the third channel 83.

Figure 5:
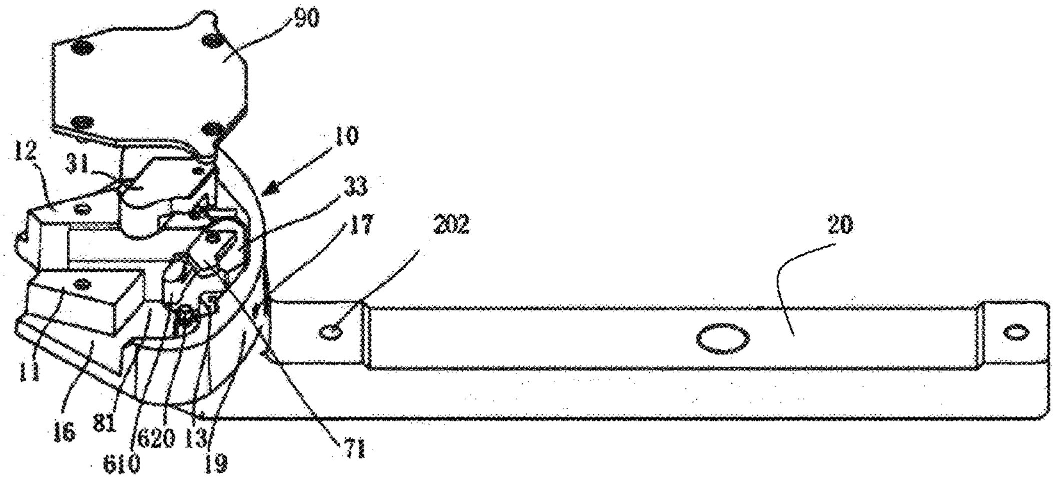
FIG. 5 is an exploded perspective view of the emergency opening structure for the revolving door according to an embodiment of the present invention.
Figure 6:
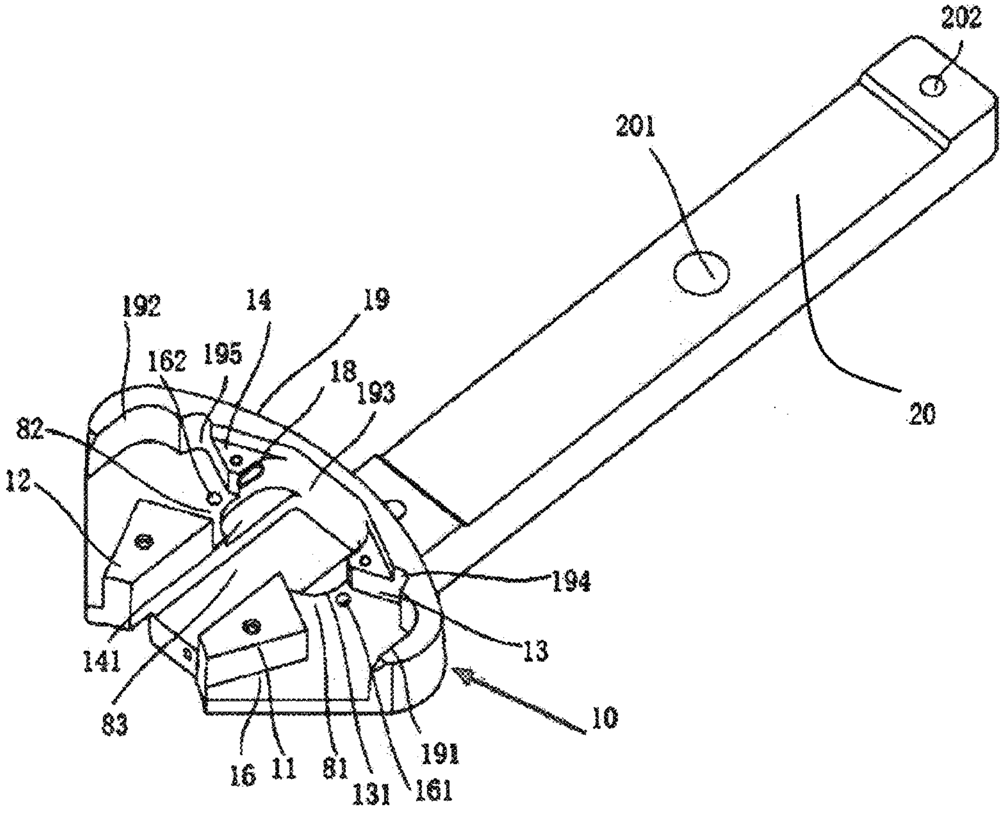
FIG. 6 is a perspective view of a base and an arm member of the emergency opening structure for the revolving door according to an embodiment of the present invention.

Specifically, referring to FIG. 5 and FIG. 6, a first protrusion 11, a second protrusion 12, a third protrusion 13 and a fourth protrusion 14 are formed on the base 10, wherein the first protrusion 11 and the third protrusion 13 are separated to form the first channel 81 for the first slider 31, and the second protrusion 12 and the fourth protrusion 14 are separated to form the second channel 82 for the second slider 32. In the first direction, the first protrusion 11 and the second protrusion 12 are opposed to each other and spaced apart while the third protrusion 13 and the fourth protrusion 14 are opposed to each other and spaced apart, to form the third channel 83 for receiving the sliding sleeve 33. The third protrusion 13 and the fourth protrusion 14 may be adjacent to the sidewall 19 of the base 10 or formed into an integrated structure with the sidewall 19 of the base 10.

As mentioned above, when the emergency opening structure 100 is changed from the normal driving position to the unlocking position, the compression spring 40 accumulates the elastic force, which helps to keep the first slider 31 and the second slider 32 in the working position. A first locking assembly 61 and a second locking assembly 62 are provided, in order to prevent the second connecting pin 532 from being accidentally disengaged from the driving shaft 510 when the first slider 31 and the second slider 32 are returned to their working position due to the recovery of the elastic force of the compression spring 40, which would possibly cause the door leaf 210 to disengage from the driving shaft 510, and thus cause an accidental safety event. The first locking assembly 61 is generally used to lock the second connecting pin 532 to prevent the second connecting pin 532 from being disengaged from the emergency opening mechanism 100 when the emergency opening mechanism 100 is unlocked counterclockwise, so as to avoid dangers. The second locking assembly 62 (see FIG. 2) is generally used to lock the first connecting pin 531 to prevent the first connecting pin 531 from disengaging from the emergency opening mechanism 100 when the emergency opening mechanism 100 is unlocked clockwise, so as to avoid dangers. In the case where the revolving door assembly 1000 is designed to be unlocked only in one direction, only one corresponding locking assembly may be designed and the other locking assembly may be omitted.

The structures and locking principles of the first locking assembly 61 and the second locking assembly 62 will be described in detail below with reference to FIGS. 3-10. In this embodiment, the structure, installation method and locking principle of the second locking assembly 62 are exactly the same as those of the first locking assembly 61. Therefore, for the sake of brevity, the first locking assembly 61 is described in detail, while the detailed description of the second locking assembly 62 is omitted.

The first locking assembly 61 includes a first elastic member 613*a* (shown in FIG. 9), a first positioning pin 620 and a first actuating member 610. The first positioning pin 620 is fixedly mounted on the bottom surface 16 of the base 10, and more specifically, being inserted into a positioning hole 161.

The first actuating member 610 has a body portion 611 and a first locking protrusion 612. The first locking protrusion 612 is disposed on the body portion 611 and is located at one end of the body portion 611 away from the first positioning pin 620. One end of the first actuating member 610 is rotatably connected with the first positioning pin 620, and the other end (that is, the end provided with the first locking protrusion 612) can rotate around the first positioning pin 620, so as to rotate to abut against the first side surface 301 to apply a pressure to the first slider 31. Specifically, a first pin hole 613 is formed in the body portion 611, and the first positioning pin 620 can be inserted into the first pin hole 613. The first elastic member 613*a* may be a torsion spring. For example, the torsion spring has a spring body, a first end and a second end, the spring body surrounds the first positioning pin 620, one end of the torsion spring is connected to the first actuating member, and the other end of the torsion spring is connected to the sidewall of the base. By configuring the first elastic member to apply an elastic force to the first actuating member 610, the first actuating member 610 is rotated to abut against the first side surface 301, and the second connecting pin 532 is locked to prevent the door leaf 210 from disengaging from the driving shaft 510 when unlocking counterclockwise.

Figure 8:
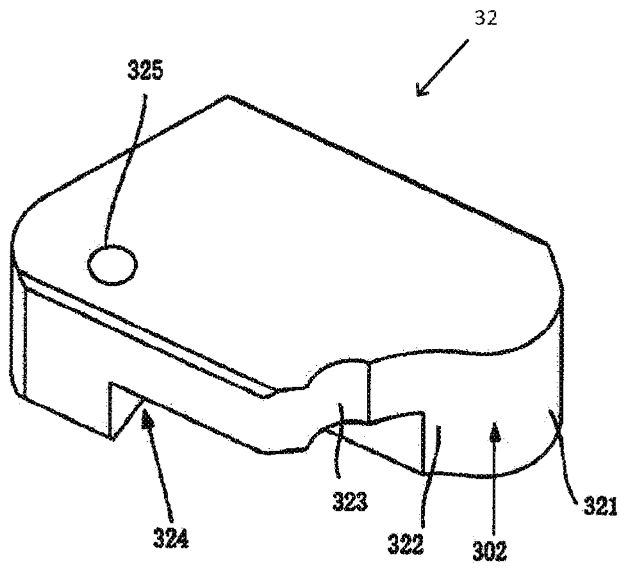
FIG. 8 is a perspective view of a second slider of the emergency opening structure for the revolving door according to an embodiment of the present invention.
Figure 9:
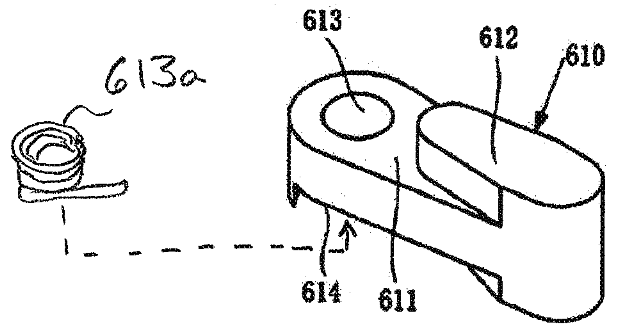
FIG. 9 is a perspective view of a first actuating member of the emergency opening structure for the revolving door according to an embodiment of the present invention.
Figure 10:
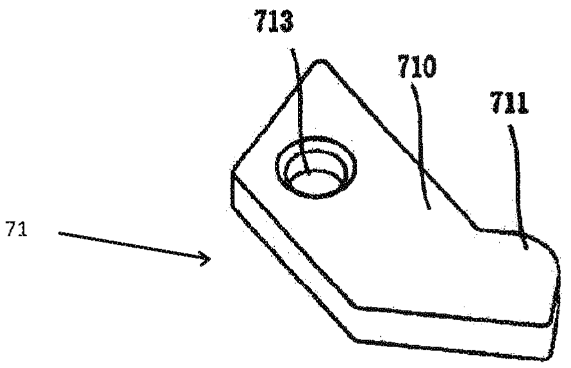
FIG. 10 is a perspective view of a first partition plate of the emergency opening structure for the revolving door according to an embodiment of the present invention.

As shown in FIG. 8, in order to mount the spring body of the torsion spring to the first positioning pin 620, an undercut space 614 is formed in the lower part of the body portion 611.

Similarly, the second locking assembly includes a second elastic member (not shown), a second positioning pin (not shown) and a second actuating member. The second positioning pin is fixedly mounted on the bottom surface 16 of the base 10, and more specifically, being fixedly inserted into a second positioning hole 162 formed on the bottom surface 16. The second actuating member has a body portion and a second locking protrusion. The second locking protrusion is provided on the body portion and is located at one end of the body portion away from the second positioning pin. Specifically, a second pin hole is formed in the body portion of the second actuating member, and the second positioning pin can be inserted into the second pin hole. One end of the second actuating member is rotatably connected with the second positioning pin, and the other end (i.e., the end provided with the second locking protrusion) can rotate around the second positioning pin so as to rotate to abut against the second side surface 302. The second elastic member may be a torsion spring. For example, the torsion spring has a spring body, a first end and a second end, the spring body surrounds the second positioning pin, one end of the second torsion spring is connected to the second actuating member, and the other end of the second torsion spring is connected to the sidewall of the base. By configuring the second elastic member to apply an elastic force to the second actuating member, the second actuating member is rotated to abut against the second side surface 302. In addition, in order to mount the spring body of the torsion spring as the second elastic member on the second positioning pin, a corresponding undercut space is also formed at the lower portion of the body portion of the second actuating member.

In order to improve the locking ability of the first locking assembly 61 and the second locking assembly 62, a first locking recess 313 is formed on the first side surface 301, and a second locking recess 323 is formed on the second side surface 302. The first locking recess 313 may be formed by being recessed from the first receiving portion 312, and the second locking recess 323 may be formed by being recessed from the second receiving portion 322.

In the counterclockwise unlocking position, the first locking protrusion 612 of the first actuating member 610 is engaged with the first locking recess 313 under the action of the first elastic member, while in the normal driving position, the first locking protrusion 612 of the first actuating member 610 is disengaged from the first locking recess 313 and can also be pressed by the first connecting pin 531 to make the first elastic member accumulate the elastic force. When the door leaf 210 is reversely rotated back to its normal position, the first connecting pin 531 sliding back into the first sliding channel 101 pushes the first actuating assembly 61 to return to its original position, that is, adjacent to the third boss 13.

Similarly, in the clockwise unlocking position, the second locking recess 323 is engaged with the second locking protrusion, while in the normal driving position, the second locking recess 323 is disengaged from the second locking protrusion, and the second locking protrusion of the second actuating member can also be pressed by the second connecting pin 532 to make the second elastic member accumulate the elastic force. When the door leaf 210 is reversely rotated back to its normal position, the second connecting pin 532 sliding back into the second sliding channel 102 pushes the second actuating assembly 61 to return to its original position, that is, adjacent to the fourth boss 14.

In order to ensure that the first slider 31, the second slider 32 and the sliding sleeve 33 to slide precisely to their desired positions within a very compact base space, a part of the first locking assembly 61 (e.g. the part connected to the first positioning pin 620) and a part of the second locking assembly 62 (e.g., the part connected to the second positioning pin) are arranged below the first slider 31 and the second slider 32, respectively, while a first partition plate 71 and a second partition plate 72 are respectively provided on the first locking assembly 61 and the second locking assembly 62. Accordingly, a first undercut space 314 is formed at the lower part of the first slider 31, and a second undercut space 324 is formed at the lower part of the second slider 32. A portion of the first locking assembly 61 and a portion of the second locking assembly 62 may rotate around the first positioning pin 610 and the second positioning pin within the first undercut space 314 and the second undercut space 324, respectively. The first partition plate 71 basically covers the first locking assembly 61 and the third protrusion 13, and the second partition plate 72 basically covers the second locking assembly 62 and the fourth protrusion 14. In addition, one side of the first partition plate 71 forms a part of the first channel 81, and one side of the second partition plate 72 forms a part of the second channel 82, whereby the first slider 31 and the second slider 32 may stably slide in the first channel 81 and the second channel 82, respectively, which improves the mechanism stability of the emergency opening structure 100 and saves the installation space of the base.

As mentioned above, the cover plate 90 is connected with the first protrusion 11 to the fourth protrusion 14 on the base 10 by screws. At the third protrusion 13 and the fourth protrusion 14, the screws pass through the holes 713 in the first partition plate 71 and the holes in the second partition 72 to secure the cover plate 90 to the base 10. Therefore, most parts of the emergency opening structure 100 for the revolving door (including the slider assembly 30 and the locking assemblies 61 and 62) are shielded by the cover plate 90, which not only helps to block dust, but also helps to improve the mechanism movement stability of the emergency opening structure 100.

In order to enhance the connection between the first partition plate 71 and the base 10, a first protruding portion 711 is formed at one end of the main body 710 of the first partition plate 71, and correspondingly, a concave 194 is formed on the inner side of the sidewall 19 adjacent to the third protrusion 13. The concave 194 is used to catch the first protrusion 711. The shape of the concave 194 may also match the shape of the end of the first actuating member 610 away from the first positioning pin 620 to further optimize the internal structure of the emergency opening structure 100. Similarly, a second protruding portion is formed at one end of the main body of the second partition plate 72, and correspondingly, a concave 195 is formed on the inner side of the sidewall 19 adjacent to the fourth protrusion 14 for catching the second protruding portion. The shape of the concave 195 may also match the shape of the end of the second actuating member away from the second positioning pin to further optimize the internal structure of the emergency opening structure 100.

The unlocking function of the emergency opening structure can also be selectively applied according to the usage scenario. To this end, the emergency opening structure 100 further includes a first stop screw and a second stop screw. Accordingly, a corresponding first threaded hole 17 and a second threaded hole 18 are provided in the sidewall of the base 19. The first stop screw is configured to extend inwardly to the first slider 31 through the sidewall of the base 19 to inhibit the first slider 31 from sliding. The second stop screw is configured to extend inwardly to the second slider 32 through the sidewall of the base 19 to inhibit the second slider 32 from sliding. When the first slider 31 is stopped, the counterclockwise unlocking of the emergency opening structure 100 is prohibited. When the second slider 32 is stopped, the clockwise unlocking of the emergency opening structure 100 is prohibited.

In addition, one end of the first slider 31 has a first limiting portion 315 such as a limiting pin. Correspondingly, a first limiting protrusion 131 for limiting the first limiting portion 315 is formed on the base 10 to prevent the first slider 31 from being detached from the first sliding channel 81. In a further embodiment, the first limiting protrusion may be a portion extending from the third protrusion 13, that is, the first limiting protrusion 131 and the third protrusion 13 are integrally formed.

Similarly, one end of the second slider 32 has a second limiting portion 325 such as a limiting pin. Correspondingly, a second limiting protrusion 141 for limiting the second limiting portion 325 is formed on the base 10 to prevent the second slider 32 from being detached from the second sliding channel 82. In a further embodiment, the second limiting protrusion 141 may be a part extending from the fourth protrusion 14, that is, the second limiting protrusion and the fourth protrusion 14 are integrally formed.

In the above embodiment, in the rest position of the emergency opening structure 100, the first slider 31 and the second slider 32 are arranged symmetrically with respect to the center line C of the base 10, wherein the center line C of the base is substantially perpendicular to the center axis of the driving shaft 510 for the revolving door, and the sliding sleeve 33 and the compression spring 40 are arranged along the extending direction of the center line C of the base 10. However, the present application is not limited to this. For example, by changing the shapes of the first slider 31 and the second slider 32, the structure of the slider assembly can omit the sliding sleeve 33 and the compression spring 40, or other intermediate parts can also be provided so as to replace the sliding sleeve or to replace both the sliding sleeve and the compression spring. That is, the slider assembly is not limited to the structure of the slider assembly depicted in the present application, as long as it can be slid or moved to enable one connecting pin to disengage from the emergency opening structure 100, while the other connecting pin is caught to be prevented from disengaging at the same time. In a further embodiment, it is more advantageous for the slider assembly to have a symmetrical structure with respect to the base, because in this way, two-way emergency opening can be realized, which is convenient for users.

In addition, the center axis of the driving shaft 510 is substantially perpendicular to the horizontal center line of the emergency opening structure 100 which coincides with the center line C of the base 10, and the first connection pin 531 and the second connection pin 532 extend parallel to the driving shaft 510.

In the embodiment of the present application, the revolving door assembly, such as the driving shaft of the revolving door, is connected with the emergency opening structure 100 through the first connecting pin 531 and the second connecting pin 532 which are parallel to each other. The emergency opening structure 100 includes a main body (e.g., the base 10 or the base 10 and the arm member 20) mounted to the door assembly 200 of the revolving door and a control mechanism (e.g., the slider assembly 30 or the slider assembly 30 and the locking assemblies 61, 62) disposed in the main body. The emergency opening structure 100 is configured to have a first accommodating cavity or first sliding channel 101 for accommodating the first connecting pin 531 and having a first outlet, and a second accommodating cavity or second sliding channel 102 for accommodating the second connecting pin 532 and having a second outlet.

The control mechanism is configured to allow the main body 10 to pivot about the second connecting pin 532 to prevent the second connecting pin 532 from disengaging from the second accommodating cavity 102 via the second outlet, and/or to allow the main body to pivot about the first connecting pin 531 to prevent the first connecting pin 531 from disengaging from the first accommodating cavity 101 via the first outlet.

The control mechanism 30 is further configured to disengage the first connecting pin 531 from the first accommodating cavity 101 via the first outlet when the main body rotates about the second connecting pin 532, and to disengage the second connecting pin 532 from the second accommodating cavity 102 via the second outlet when the main body 10 rotates about the first connecting pin 531.

The technical features of the above-described embodiments can be combined arbitrarily. For the sake of brevity, not all possible combinations of the technical features in the above-described embodiments are described. However, as long as there is no contradiction between the combinations of these technical features, all the combinations should be regarded as falling within the scope described in this specification.

The above-mentioned embodiments only illustrate several embodiments of the present invention, and the descriptions thereof are relatively specific and detailed, but should not be construed as a limitation of the scope of the present application. It should be pointed out that for those of ordinary skilled in the art, without departing from the inventive concept of the present application, several modifications and improvements can also be made, which all belong to the protection scope of the present invention.

The invention claimed is:

1. An emergency opening structure for a revolving door, characterized in that the emergency opening structure is configured to connect with a first connecting pin and a second connecting pin installed on a driving shaft for the revolving door, and comprises:

a slider assembly having a first side surface and a second side surface opposite to each other; and a base having a sidewall, the slider assembly being disposed on an inner side of the sidewall and configured to move relative to the base, a first sliding channel being formed between a first portion of the sidewall and the first side surface, and a second sliding channel being formed between a second portion of the sidewall and the second side surface, wherein the first sliding channel and the second sliding channel are configured to accommodate the first connecting pin and the second connecting pin, respectively, wherein the emergency opening structure has a normal driving position and an unlocking position, and in the normal driving position, the first connecting pin and the second connecting pin are clamped in the first sliding channel and the second sliding channel, respectively, and in the unlocking position, the base rotates around the second connecting pin to a position where the first connection pin slides out of the first sliding channel, while the second side surface and the second portion of the sidewall remain pressing against the second connecting pin so as to prevent the second connecting pin from disengaging from the second sliding channel, wherein the slider assembly comprises a first slider and a second slider, wherein the first side surface is formed on the first slider, the second side surface is formed on the second slider, and the first slider is configured to push the second slider to move, and wherein the structure further comprises:

a first locking assembly and/or a second locking assembly, wherein the first locking assembly includes:

a first positioning pin fixedly mounted on the bottom surface of the base;

a first actuating member having a first locking protrusion, one end of which is rotatably connected with the first positioning pin, and the other end of which is rotatable around the first positioning pin; and a first elastic member configured to apply an elastic force to the first actuating member to rotate the first actuating member to contact with the first side surface, wherein the second locking assembly includes:

a second positioning pin fixedly mounted on the bottom surface of the base;

a second actuating member having a second locking protrusion, one end of which is rotatably connected to the second positioning pin, and the other end of which is rotatable around the second positioning pin to rotate the second actuating member to contact with the second side surface; and a second elastic member is configured to apply an elastic force to the second actuating member to rotate the second actuating member to contact with the second side surface.

2. The emergency opening structure according to claim 1, characterized in that, the first side surface has a first receiving portion and a first pressing portion, and the second side surface has a second receiving portion and a second pressing portion, wherein in the normal driving position, the first connecting pin contacts the first receiving portion, and the second connecting pin contacts the second receiving portion, and in the unlocking position, the first connecting pin presses the first pressing portion, and the second pressing receiving portion presses the second connecting pin, wherein the first receiving portion and the second receiving portion are formed as concave surfaces, and the first pressing portion and the second pressing portion are formed as convex surfaces.

3. The emergency opening structure according to claim 1, characterized in that the emergency opening structure further has another unlocking position, wherein in the another unlocking position, the base is rotated around the first connecting pin to a position where the second connecting pin slides out of the second sliding channel, and the first side surface and the first portion of the sidewall keep pressing against the first connecting pin to prevent the first connecting pin from disengaging from the first sliding channel.

4. The emergency opening structure according to claim 1, characterized in that the slider assembly further comprises a sliding sleeve between the first slider and the second slider, the sliding sleeve being configured to slide relative to the base along a first direction, and the first slider being configured to slide relative to the base along a second direction intersecting with the first direction to push the second slider to move via the sliding sleeve, so that the second side surface of the second slider and the second portion of the sidewall keep clamping the second connecting pin.

5. The emergency opening structure according to claim 1, characterized in that the slider assembly further comprises:

a compression spring, one end of which is inserted into the sliding sleeve, and the other end of which is connected to the sidewall of the base.

6. The emergency opening structure according to claim 4, characterized in that the sliding sleeve has a tubular body portion having a constant cross section and a radial protrusion formed at one end of the tubular body portion close to the sidewall of the base, wherein, in the normal driving position, the first slider and the second slider press against the radial protrusion, and in the unlocked position, the first slider and the second slider press against the tubular body portion, wherein the radial protrusion is closer to the sidewall of the base than the tubular body portion.

7. The emergency opening structure according to claim 1, characterized in that, when the emergency opening structure has the first locking assembly, the first actuating member has a first body portion and the first locking protrusion, wherein the first locking protrusion is formed on the first body portion and at the other end of the first actuating member, and a part of the first body portion is located below the first slider, when the emergency opening structure has the second locking assembly, the second actuating member has a second body portion and the second locking protrusion, wherein the second locking protrusion is formed on the second body portion and at the other end of the second actuating member, and a part of the second body portion is located below the second slider.

8. The emergency opening structure according to claim 1, characterized in that, when the emergency opening structure has the first locking assembly, a first locking recess is formed on the first side surface, wherein in the unlocking position, the first locking protrusion of the first actuating member engages with the first locking recess under the action of the first elastic member, wherein in the normal driving position, the first locking protrusion of the first actuating member is disengaged from the first locking recess and pressed by the first connecting pin, and when the emergency opening structure has the second locking assembly, a second locking recess is formed on the second side surface and configured to engage with or disengage from the second locking protrusion, wherein in the normal driving position, the second locking protrusion of the second actuating member is disengaged from the second locking recess and pressed by the second connecting pin.

9. The emergency opening structure according to claim 4, characterized in that the base is formed in a symmetrical structure and has a center line, and the first slider and the second slider are symmetrically arranged with respect to the center line of the base, wherein the center line of the base is substantially perpendicular to a center axis of the driving shaft of the revolving door, and the sliding sleeve is arranged along an extending direction of the center line of the base.

10. The emergency opening structure according to claim 1, characterized in that the emergency opening structure further comprises a cover plate for covering at least the slider assembly, wherein the cover plate is fixedly connected to the base through screws.

11. An emergency opening structure for a revolving door, a driving shaft of the revolving door is connected to the emergency opening structure through a first connecting pin and a second connecting pin that are parallel to each other, wherein the emergency opening structure comprises a main body mounted to a door assembly of the revolving door and a control mechanism provided in the main body, and is configured to comprise:

a first accommodating cavity for accommodating the first connecting pin and having a first outlet and a first locking assembly; and a second accommodating cavity for accommodating the second connecting pin and having a second outlet and a second locking assembly, wherein the control mechanism is configured to be moved by the first connecting pin to disengage the first connecting pin from the first accommodating cavity and allow the main body to pivot about the second connecting pin wherein movement of the first connecting pin actuates the first locking assembly to prevent the second connecting pin from disengaging from the second accommodating cavity via the second outlet, and/or wherein the control mechanism is configured to be moved by the second connecting pin to disengage the second connecting pin from the second accommodating cavity and allow the main body to pivot about the first connecting pin, wherein movement of the second connecting pin actuates the second locking assembly to prevent the first connecting pin from disengaging the first accommodating cavity via the first outlet.

12. The emergency opening structure according to claim 11, characterized in that the control mechanism is configured to enable the first connecting pin to disengage from the first accommodating cavity via the first outlet when the main body rotates around the second connecting pin, and to enable the second connecting pin to disengage from the second accommodating cavity via the second outlet when the main body rotates around the first connecting pin.

13. A revolving door assembly, including a door assembly, comprising a driving shaft, a connecting flange, a first connecting pin, a second connecting pin, and an emergency opening structure, wherein the first connecting pin and the second connecting pin are connected with the connecting flange, wherein a central axis of the driving shaft is substantially perpendicular to a horizontal center line of the emergency opening structure, and the first connecting pin and the second connecting pin extend parallel to the driving shaft, and wherein the emergency opening structure comprises;

a slider assembly having a first side surface and a second side surface opposite to each other; and a base having a sidewall, the slider assembly being disposed on an inner side of the sidewall and configured to move relative to the base, a first sliding channel being formed between a first portion of the sidewall and the first side surface, and a second sliding channel being formed between a second portion of the sidewall and the second side surface, wherein the first sliding channel and the second sliding channel are configured to accommodate the first connecting pin and the second connecting pin, respectively, wherein the emergency opening structure has a normal driving position and an unlocking position, and in the normal driving position, the first connecting pin and the second connecting pin are clamped in the first sliding channel and the second sliding channel, respectively, and in the unlocking position, the base rotates around the second connecting pin to a position where the first connection pin slides out of the first sliding channel, while the second side surface and the second portion of the sidewall remain pressing against the second connecting pin so as to prevent the second connecting pin from disengaging from the second sliding channel, wherein the slider assembly comprises a first slider and a second slider, wherein the first side surface is formed on the first slider, the second side surface is formed on the second slider, and the first slider is configured to push the second slider to move, and wherein the structure further comprises:

a first locking assembly and/or a second locking assembly, wherein the first locking assembly includes:

a first positioning pin fixedly mounted on the bottom surface of the base;

a first actuating member having a first locking protrusion, one end of which is rotatably connected with the first positioning pin, and the other end of which is rotatable around the first positioning pin, and a first elastic member configured to apply an elastic force to the first actuating member to rotate the first actuating member to contact with the first side surface, wherein the second locking assembly includes:

a second positioning pin fixedly mounted on the bottom surface of the base:

a second actuating member having a second locking protrusion, one end of which is rotatably connected to the second positioning pin, and the other end of which is rotatable around the second positioning pin to rotate the second actuating member to contact with the second side surface; and a second elastic member is configured to apply an elastic force to the second actuating member to rotate the second actuating member to contact with the second side surface.

* * * * *